United States Patent
Liang

(10) Patent No.: US 10,841,432 B2
(45) Date of Patent: Nov. 17, 2020

(54) ECHO DELAY TRACKING METHOD AND APPARATUS

(71) Applicant: TENCENT TECHNOLOGY (SHENZHEN) COMPANY LIMITED, Shenzhen (CN)

(72) Inventor: Junbin Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 147 days.

(21) Appl. No.: 16/141,953

(22) Filed: Sep. 25, 2018

(65) Prior Publication Data

US 2019/0027160 A1 Jan. 24, 2019

Related U.S. Application Data

(63) Continuation of application No. PCT/CN2017/085467, filed on May 23, 2017.

(30) Foreign Application Priority Data

May 25, 2016 (CN) .......................... 2016 1 0353009

(51) Int. Cl.
  *H04M 9/08* (2006.01)
  *G10L 21/0264* (2013.01)
  (Continued)

(52) U.S. Cl.
  CPC ......... *H04M 9/082* (2013.01); *G10L 21/0264* (2013.01); *H04M 9/08* (2013.01); *H04R 3/04* (2013.01); *G10L 2021/02082* (2013.01)

(58) Field of Classification Search
  CPC .............................. H04M 9/08; H04M 9/082
  See application file for complete search history.

(56) References Cited

U.S. PATENT DOCUMENTS 6,092,040 A * 7/2000 Voran ...................... G10L 25/48
   455/67.13
6,574,336 B1 * 6/2003 Kirla ..................... H04M 9/082
   379/406.01
(Continued)

FOREIGN PATENT DOCUMENTS

CN   101026659 A   8/2007
CN   101321201 A   12/2008
(Continued)

OTHER PUBLICATIONS

The World Intellectual Property Organization (WIPO) International Search Report for PCT/CN2017/085467 dated Aug. 11, 2017 5 Pages (including translation).
(Continued)

*Primary Examiner* — Shaun Roberts
(74) *Attorney, Agent, or Firm* — Anova Law Group, PLLC

(57) ABSTRACT

An echo delay tracking method includes obtaining, by a computing terminal, a current frame reference signal and a current frame collection signal; and identifying target frequency information in the current frame collection signal according to signal-to-noise ratios of the current frame collection signal at a plurality of frequencies. The target frequency information includes at least one target frequency that corresponds to a signal-to-noise ratio greater than a first preset threshold. The method also includes determining whether the current frame collection signal is a valid frame signal based on the target frequency information; and if yes, performing a cross-correlation operation of a signal component of the current frame reference signal corresponding to the target frequency and a signal component of the current frame collection signal corresponding to the target fre-
(Continued)

quency. An echo delay value can be obtained according to a result of the cross-correlation operation.

8 Claims, 9 Drawing Sheets

(51) Int. Cl.
   *H04R 3/04* (2006.01)
   *G10L 21/0208* (2013.01)

(56) References Cited

U.S. PATENT DOCUMENTS

| | | | |
|---|---|---|---|
| 7,058,185 B1* | 6/2006 | Egelmeers | H03H 21/0027 381/93 |
| 7,304,962 B1* | 12/2007 | Kirla | H04B 3/23 370/289 |
| 2004/0252652 A1* | 12/2004 | Berestesky | H04B 3/23 370/286 |
| 2009/0252343 A1 | 10/2009 | Mao | |
| 2009/0316924 A1 | 12/2009 | Prakash et al. | |
| 2012/0250871 A1* | 10/2012 | Lu | G10K 11/16 381/66 |
| 2015/0078564 A1 | 3/2015 | Guo et al. | |
| 2016/0029120 A1* | 1/2016 | Nesta | H04M 9/082 381/66 |
| 2016/0127527 A1 | 5/2016 | Mani et al. | |

FOREIGN PATENT DOCUMENTS

| | | |
|---|---|---|
| CN | 102726034 A | 10/2012 |
| CN | 104506747 A | 4/2015 |
| CN | 105472191 A | 4/2016 |
| CN | 105872156 A | 8/2016 |
| JP | 2000507432 A | 6/2000 |
| WO | 2006111369 A1 | 10/2006 |

OTHER PUBLICATIONS

The State Intellectual Property Office of the People's Republic of China (SIPO) Office Action 1 for 201610353009.X dated May 4, 2018 8 Pages (including translation).

Indian Patent Office Examination report for Application No. 201847017164 dated May 1, 2020 6 pages.

* cited by examiner

ECHO DELAY TRACKING METHOD AND APPARATUS

RELATED APPLICATION

This application is a continuation application of PCT Patent Application No. PCT/CN2017/085467, filed on May 23, 2017, which claims priority to Chinese Patent Application No. 201610353009.X, filed with the Chinese Patent Office on May 25, 2016, and entitled "ECHO DELAY TRACKING METHOD AND APPARATUS", the entire contents of both of which are incorporated herein by reference.

FIELD OF THE TECHNOLOGY

The present disclosure relates to the field of computer communication, and in particular, to an echo delay tracking method and echo delay tracking apparatus.

BACKGROUND OF THE DISCLOSURE

Echo delay detection is a preprocessing sector of an acoustic echo cancellation algorithm. Before echo cancellation processing is performed, a time difference between a reference signal (a speaker play signal) and an echo signal of the reference signal, that is, an echo delay, is calculated first, so that adaptive filtering echo cancellation and non-linear echo suppression processing are performed subsequently. An existing solution has relatively weak interference immunity, and an echo delay is prone to be misdetermined, leading to many residual echoes.

SUMMARY

Embodiments of the present disclosure provide an echo delay tracking method, an echo delay tracking apparatus, and a mobile electronic device, to effectively resolve a technical problem that an existing technical solution has relatively weak interference immunity, and an echo delay is prone to be misdetermined, leading to many residual echoes.

To resolve the foregoing technical problem, one aspect of the embodiments of the present disclosure discloses an echo delay tracking method. The method includes obtaining, by a computing terminal, a current frame reference signal related to an audio output device of the computing terminal and a current frame collection signal collected by an audio input device of the computing terminal. The method also includes identifying, by the computing terminal, target frequency information in the current frame collection signal according to signal-to-noise ratios of the current frame collection signal at a plurality of frequencies. The target frequency information includes at least one target frequency and each target frequency corresponds to a signal-to-noise ratio greater than a first preset threshold. The method also includes determining whether the current frame collection signal is a valid frame signal satisfying a preset condition based on the target frequency information; and in response to determining that the current frame collection signal is a valid frame signal satisfying the preset condition, performing a cross-correlation operation of a signal component of the current frame reference signal corresponding to the target frequency and a signal component of the current frame collection signal corresponding to the target frequency. An echo delay value can be obtained according to a result of the cross-correlation operation.

Another aspect of the embodiments of the present disclosure provides an echo delay tracking apparatus at least including a processor and a memory. The processor is configured to perform: obtaining a current frame reference signal related to an audio output device of the apparatus and a current frame collection signal collected by an audio input device of the apparatus; and identifying target frequency information in the current frame collection signal according to signal-to-noise ratios of the current frame collection signal at a plurality of frequencies. The target frequency information includes at least one target frequency and each target frequency corresponds to a signal-to-noise ratio greater than a first preset threshold. The processor is also configured to perform: determining whether the current frame collection signal is a valid frame signal satisfying a preset condition based on the target frequency information; and in response to determining that the current frame collection signal is a valid frame signal satisfying the preset condition, performing a cross-correlation operation of a signal component of the current frame reference signal corresponding to the target frequency and a signal component of the current frame collection signal corresponding to the target frequency. An echo delay value can be obtained according to a result of the cross-correlation operation.

Another aspect of the embodiments of the present disclosure provides a non-transitory computer storage medium, the computer storage medium stores computer program instructions executable by at least one processor. When being executed, the computer program instructions cause the at least one processor to perform: obtaining a current frame reference signal related to an audio output device of the apparatus and a current frame collection signal collected by an audio input device of the apparatus; and identifying target frequency information in the current frame collection signal according to signal-to-noise ratios of the current frame collection signal at a plurality of frequencies. The target frequency information includes at least one target frequency and each target frequency corresponds to a signal-to-noise ratio greater than a first preset threshold. The computer program instructions cause the at least one processor to perform: determining whether the current frame collection signal is a valid frame signal satisfying a preset condition based on the target frequency information; and in response to determining that the current frame collection signal is a valid frame signal satisfying the preset condition, performing a cross-correlation operation of a signal component of the current frame reference signal corresponding to the target frequency and a signal component of the current frame collection signal corresponding to the target frequency. An echo delay value can be obtained according to a result of the cross-correlation operation.

BRIEF DESCRIPTION OF THE DRAWINGS

To describe the technical solutions in the embodiments of the present disclosure or in the existing technology more clearly, the following briefly describes the accompanying drawings required for describing the embodiments or the existing technology. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some embodiments of the present disclosure rather than all of the embodiments. All other embodiments obtained by a person of ordinary skill in the art based on the embodiments of the present disclosure without creative efforts shall fall within the protection scope of the present disclosure.

Figure 1:
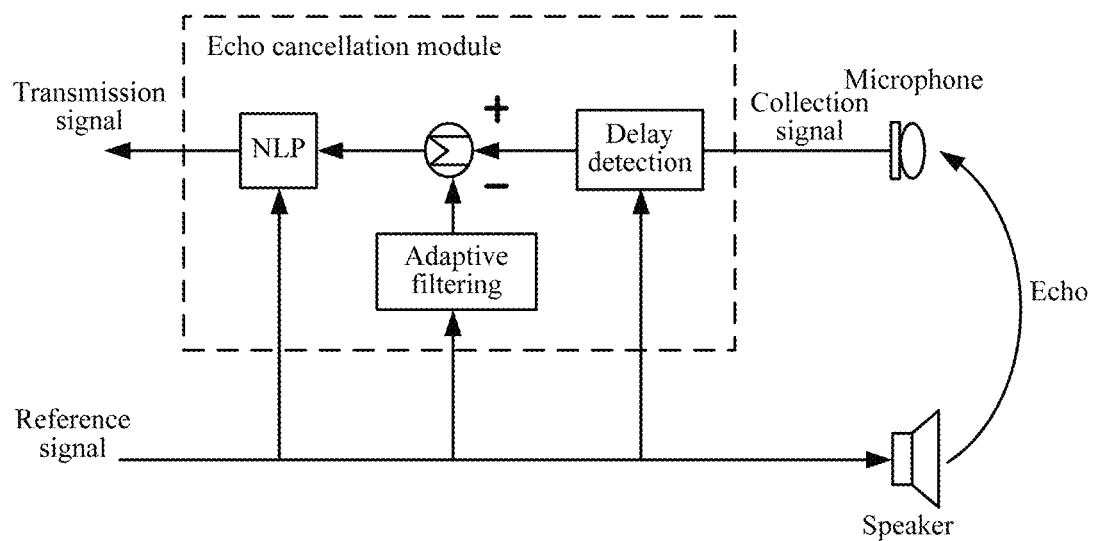
FIG. 1 is a schematic flowchart of an echo cancellation mechanism according to an embodiment of the present disclosure.

FIG. 1 is a schematic flowchart of an echo cancellation mechanism according to an embodiment of the present disclosure. When a voice reference signal that is from a speaker of a call device is transmitted through air and is picked up by a microphone, an echo is generated. In other words, in a computing device containing an audio output circuit (e.g., a speaker), an audio input circuit (e.g., a microphone) and a processor, the speaker may output/broadcast a reference signal, and the microphone may collect an input corresponding to the reference signal, i.e., an echo. For example, during a phone call or voice/video call between a remote user of a remote device and a local user of the computing device, the speaker is configured to play audio signal received from the remote device, and the microphone is configured to collect voice signal from the local user which is then sent to the remote device. That is, echo cancellation can prevent users from hearing his/her own voice again and improve voice quality. The echo cancellation mechanism may include, according a reference signal from a speaker, detecting a time delay of the echo, adjusting a timeline of a collection signal from the microphone based on the time delay, and performing adaptive filtering and/or non-linear processing on the collection signal.

Figure 2:
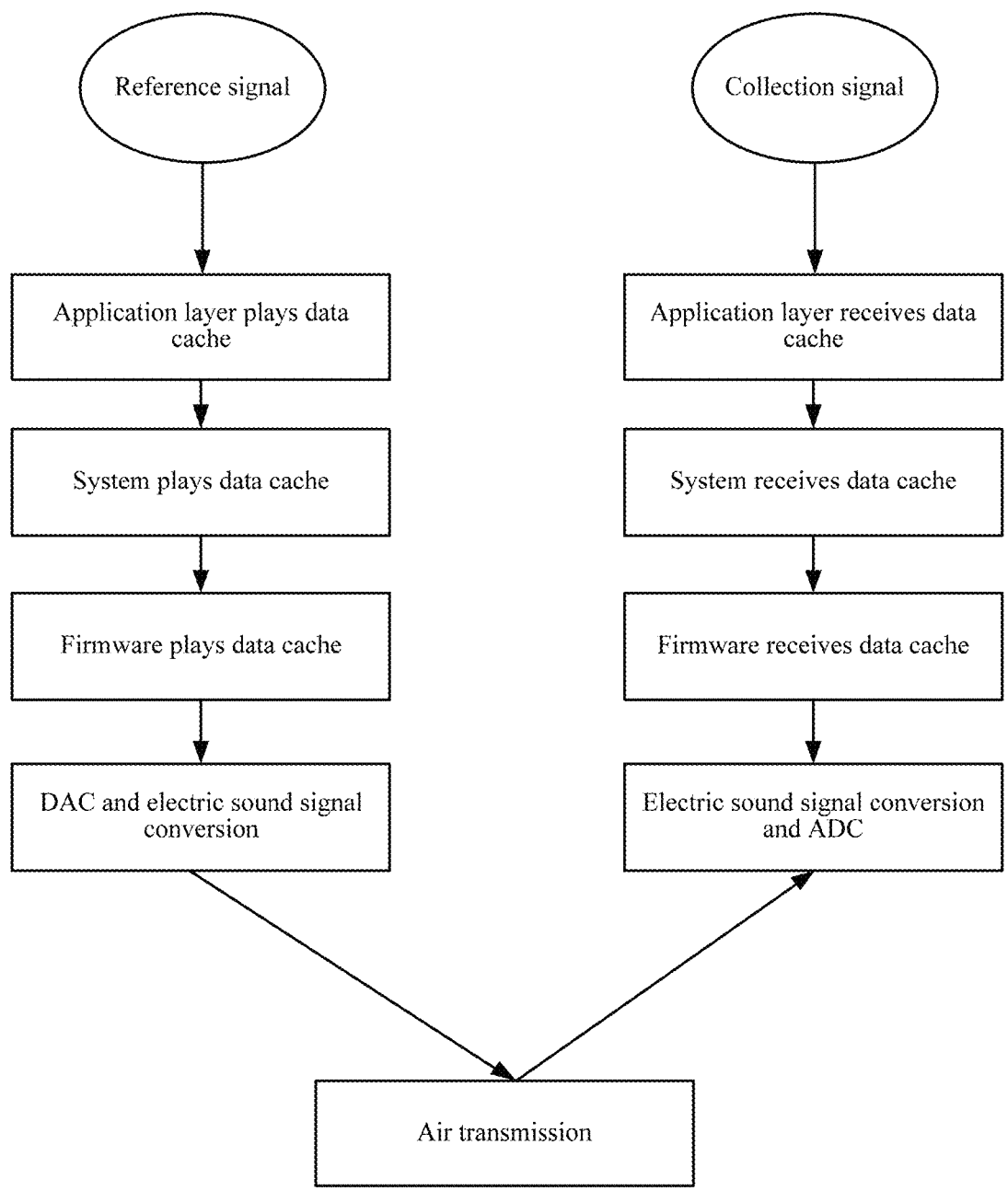
FIG. 2 is a schematic diagram of a principle of a related sector of generating an echo delay according to an embodiment of the present disclosure.

FIG. 2 is a schematic diagram of a principle of a related sector of generating an echo delay according to an embodiment of the present disclosure. Because an echo signal (a reference signal that produces echo) needs to be cached by an application layer, a system layer, and underlying firmware of a play end and a collection end, a relatively long delay is caused by the caches. Additional time delay can occur during digital-analog conversion and conversion from an electrical signal to an acoustic signal at the play end, and conversion from acoustic signal to electrical signal and analog-digital conversion at the collection end. In addition, voice is transmitted in the air, and a reference signal is arrived at the signal collection end after a relatively long delay. An echo cancellation mechanism may perform, after a delay detection mechanism performs accuracy detection on the above-described time delay, timeline alignment on the double-end signals (i.e., reference signal at the play end and collection signal at the collection end), and perform echo cancellation based on the aligned signals. After echo cancellation, the result signal may be transmitted to a peer end of the current communication for being played to the peer user.

In the technical solutions in FIG. 1 and FIG. 2, that based on calculation of a cross-correlation function of a remote end signal and a local end signal (the remote end signal is the reference signal sent from a remote device participating a current voice communication and broadcasted by the speaker, and the local end signal is the signal collected by the microphone), a maximum value of relevance is searched, and a time difference that is between the remote end signal and the local end signal and that corresponds to the value is used as an echo delay value specifically includes: performing FFT on the remote end signal and the local end signal, to obtain a remote end power spectrum and a local end power spectrum, and then calculating a cross-correlation function of the power spectrums of the remote end signal and the local end signal in a current frame, tracking and filtering the cross-correlation function, and using a peak value of a filtering result as the echo delay value.

Figure 3:
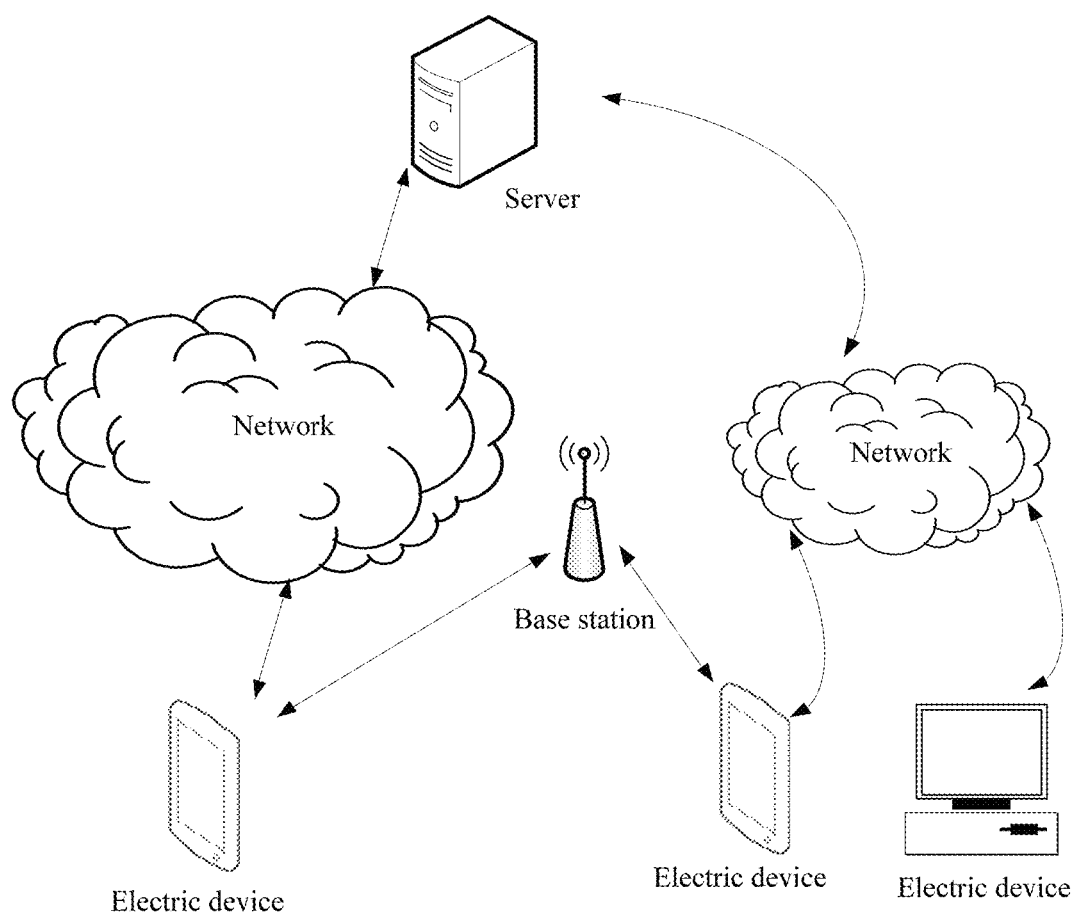
FIG. 3 is an architectural diagram of a scenario of an echo delay tracking method according to an embodiment of the present disclosure.

As shown in FIG. 3, FIG. 3 is an architectural diagram of a scenario of an echo delay tracking method according to an embodiment of the present disclosure. A voice connection may be established between electronic devices by using a network server, to perform voice communication. A data sender may send in real time a collected voice data frame by using a collection apparatus such as a microphone to a data receiver, and at the same time play in real time, by using a speaker, a voice data frame sent by the data receiver. The electric device needs to perform echo delay processing on a remote end voice signal and a local end voice signal, to cancel an echo and non-linear echo suppression.

Figure 4:
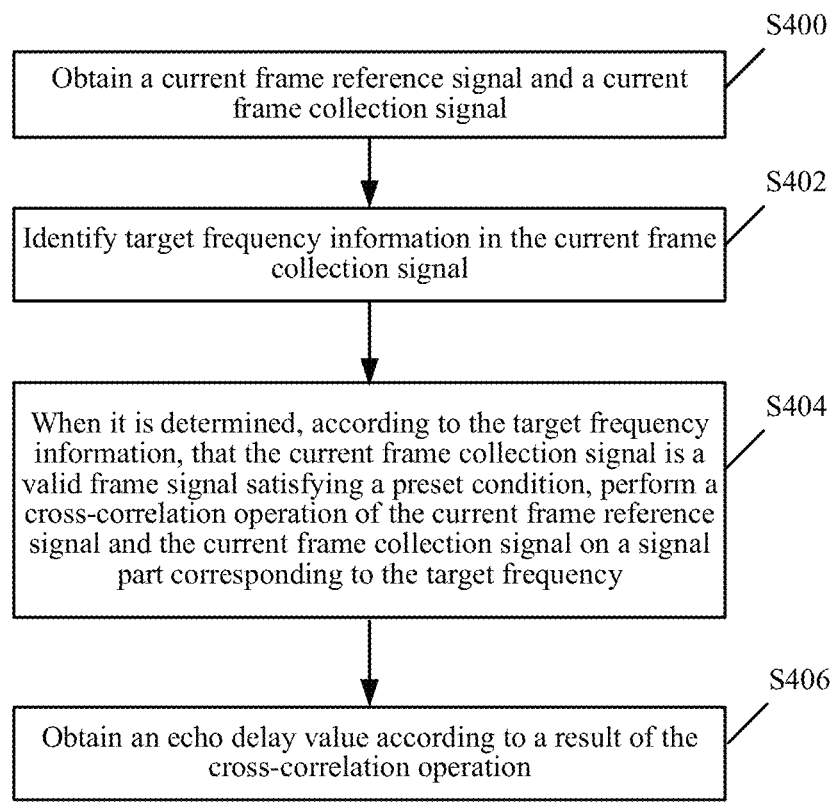
FIG. 4 is a schematic flowchart of an echo delay tracking method according to an embodiment of the present disclosure.

The following describes in detail with reference to FIG. 4, a schematic flowchart of an echo delay tracking method according to an embodiment of the present disclosure, a technical solution of the echo delay tracking method provided in the embodiment of the present disclosure. The technical solution includes the following steps:

Step S400: Obtain a current frame reference signal and a current frame collection signal.

Specifically, a voice communication connection is established between two voice communication parties, and both electric devices of the two parties can obtain in real time a voice signal sent by the peer end (that is, a voice reference signal) and a voice signal collected by the local end (that is, a voice collection signal).

Step S402: Identify target frequency information in the current frame collection signal according to signal-to-noise ratios of the current frame collection signal at a plurality of frequencies.

Specifically, an electric device identifies a collection signal of a current frame, a threshold may be preset (that is, a first preset threshold, the threshold may be set to 0.1, and a technical person may set the threshold according to requirements or experience of the person), and a signal-to-noise ratio of each frequency of the current frame collection signal is compared with the first preset threshold, to find out all frequencies whose corresponding signal-to-noise (SNR) ratios are greater than the first preset threshold, and use such frequencies as target frequencies. A signal-to-noise ratio of a frequency, as used herein, may refer to the signal-to-noise ratio of the collection signal at the frequency. That is, the collection signal may be considered as a combination of signal components at a plurality of frequencies. The signal components may have different signal-to-noise ratios, each signal component may have a corresponding signal-to-noise ratio. In some embodiments, the number of target frequencies are less than a total number of signal components that the signal is divided into (i.e., a total number of frequencies used for dividing the collection signal, such as frequencies used in an FFT). By identifying less frequencies that correspond to high SNR ratios instead of working with all frequencies with random SNR ratios, errors in echo delay time detection caused by signal components with low SNR ratios can be avoided, thereby increasing accuracy of delay time detection and echo cancellation, and improving voice communication quality.

It may be understood that, the collection signal at the target frequency corresponds to a high signal-to-noise ratio, and the first preset threshold is not limited in the embodiment of the present disclosure. The technical person may set the first preset threshold according to the requirements or experience of the technical person. The target frequency information in the embodiment of the present disclosure may include a quantity, or a position, or information related to a quantity, or information related to a position, or the like of the target frequency. A position of a frequency may correspond to an actual value or level of the frequency.

Step S404: When it is determined, according to the target frequency information, that the current frame collection signal is a valid frame signal satisfying a preset condition, perform a cross-correlation operation of the current frame reference signal and the current frame collection signal on a signal part corresponding to the target frequency. In other words, step S404 may include: determining whether the current frame collection signal is a valid frame signal satisfying a preset condition based on the target frequency information; and in response to determining that the current frame collection signal is a valid frame signal satisfying the preset condition, performing a cross-correlation operation of a signal component of the current frame reference signal corresponding to the target frequency and a signal component of the current frame collection signal corresponding to the target frequency.

Specifically, in the embodiment of the present disclosure, a determining policy may be preset, and whether a current frame collection signal is a valid frame signal is determined according to the target frequency information. For example, whether a current frame collection signal is a valid frame signal may be determined according to a quantity of the target frequencies, or position distribution of the target frequencies, or the like, including whether the quantity reaches a preset value, or whether a percentage that the quantity of the target frequencies in all frequencies reaches a preset value, or whether position distribution matches a preset situation, or the like, and is not limited in the embodiment of the present disclosure. The technical person may set the determining policy according to an actual situation, and the determining policy shall fall within the protection scope of the embodiment of the present disclosure provided that whether a current frame collection signal is a valid frame signal is determined according to the target frequency information.

In the embodiment of the present disclosure, the cross-correlation operation is performed only on the valid frame signal. If it is determined that the current frame collection signal is not a valid frame signal, echo delay tracking processing may not be performed on the current frame collection signal. If it is determined that the current frame collection signal is a valid frame signal, the cross-correlation operation of the current frame reference signal and the current frame collection signal is performed only on a signal part/component corresponding to the at least one target frequency, to obtain a result of the cross-correlation operation. By differentiating valid frame signal and non-valid frame signal, interferences of collected noise signals can be decreased or eliminated in echo cancellation, especially in echo delay detection.

Step S406: Obtain an echo delay value according to a result of the cross-correlation operation.

In some embodiments, the method includes: obtaining a first binary array describing the current frame collection signal at the at the at least one target frequency, each element of the first binary array corresponding to one frequency; obtaining n second binary arrays describing recent n frames of reference signals at the at least one target frequencies, each second binary array representing one recent frame, n being an integer greater than 1; for each second binary array that corresponds to one of the recent n frames of reference signals, performing an XOR operation between an element of the first array and an element of the second array corresponding to a same target frequency to obtain an XOR operation result value, repeating the XOR operation for all of the at least one target frequency and adding up XOR operation result values to obtain a sum value corresponding to the one of the recent n frames of reference signals; comparing sum values corresponding to the recent n frames of reference signals to identify an ith frame reference signal having a minimum sum value; and associating the ith frame reference signal with the current frame collection signal for echo cancellation. The echo delay value may include frame number i.

Specifically, in a regular voice call application, a most common factor that interferes echo delay tracking is mainly a local end background noise. The local end background noise is collected by the microphone together with the echo signal. Because a noise may be a stable noise or may be an unstable noise, even though a noise suppression module is added before the echo delay tracking processing is performed, it is very difficult to obtain a pure echo signal without a noise. As a result, such a noisy signal affects the accuracy of a cross-correlation operation of spectrum energy. Especially, in a low signal-to-noise ratio application scenario, a noise is more powerful than a signal, a cross-correlation value obtained in this case has a great error, and a finally tracked echo delay value is inaccurate, directly leading to that an echo cancellation module cannot cancel an echo, and that the echo is residual and local end voice is destroyed. A result that is of the cross-correlation operation and that is obtained according to step S404 is that the cross-correlation operation is performed only on a signal component at a frequency corresponding to high signal-to-noise ratio, and therefore it is avoided that signal components at frequencies with low signal-to-noise ratio interferes the accuracy of the cross-correlation operation, a technical problem that an existing technical solution has relatively weak anti-interference performance, and an echo delay is prone to be misjudged, leading to many residual echoes and poor audio quality is effectively resolved, and the accuracy of the echo delay value is greatly improved.

Figure 5:
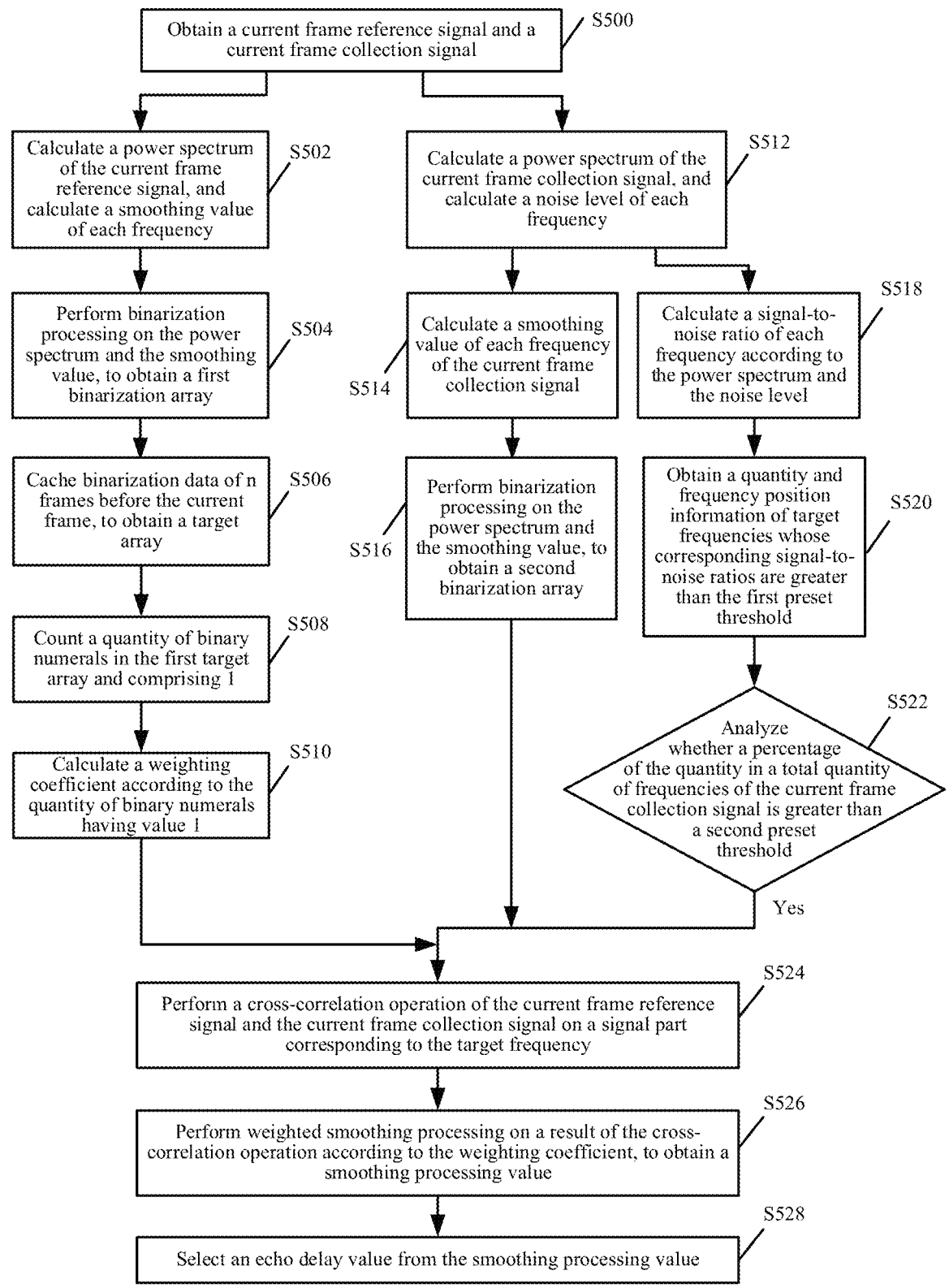
FIG. 5 is a schematic flowchart of an echo delay tracking method according to another embodiment of the present disclosure.

Further, as shown in FIG. 5, FIG. 5 is a schematic flowchart of an echo delay tracking method according to another embodiment of the present disclosure. Specific implementations of the echo delay tracking method in the present disclosure are described in detail by using an example, and include the following steps:

Step S500: Obtain a current frame reference signal and a current frame collection signal.

Specifically, refer to step S400 in the embodiment in FIG. 4, and details are not described herein again.

Step S502: Calculate a power spectrum of the current frame reference signal, and calculate a smoothing value of the current frame reference signal at each frequency.

Specifically, the FFT may be performed on the current frame reference signal, to obtain a power spectrum Ref(j), where j=m1~m2, m1=INT(M*500)/fs*2, m2=INT(M*1200)/fs*2, M is half of a quantity of points of FFT, and fs is a sampling frequency value. Then, at each frequency j, a smoothing value of the current frame Refsm(j, t+1) can be calculated based on the smoothing value of a previous/last frame Refsm(j, t) and the power of the current frame Ref(j). For example, the calculation equation is Refsm(j, t+1)=0.98*Refsm(j, t)+0.02*Ref(j), where 0.98 and 0.02 are coefficients that can be adjusted based on practical applications.

Step S504: Perform binarization processing on the power spectrum and the smoothing value, to obtain a first binarization array.

Specifically, numeral comparison may be performed between Ref(j) and Refsm(j, t+1). If Ref(j) is greater than Refsm(j, t+1), the first binarization array is 1; otherwise the first binarization array is 0, so that the first binarization array is obtained, that is, a binarization array of Refb(j) is obtained, and Refb(j) is a one-dimensional array having m2−m1+1 elements, each element corresponding to a comparison result between the smoothing value and the power of the current frame at one frequency j.

Step S506: Cache binarization data of most recent n frames (e.g., the current frame and n−1 previous frames), to obtain a target array by adding the first binarization array to the binarization data and removing data related to frames earlier than the recent n frames.

Specifically, the target array may be obtained by saving/adding Refb(j) (i.e., the first binarization array) to a Refbbuf(i) (j) array. For example, the cache for the binarization data stores binarization results of the most recent n frames and the array corresponding to the cached binarization data can be denoted as Refbbuf(i) (j), where i=0~n−1. When Refb(j) for the current frame is obtained, the binarization array corresponding to a frame earlier than the most recent n frames (if available) may be pushed out from the cache, and the first binarization array of the current frame Refb(j) can be added to the cache. That is, data stored in the cache can be obtained as the target array Refbbuf(i) (j), where i=0~n−1, and a size of the array is n*(m2−m1+1), where n is a positive integer.

Step S508: Count a quantity of binary numerals in the target array having non-zero value. That is, binary numerals in the target array whose values are 1 are counted.

Specifically, a quantity of binary numerals One_Ref(i) of each Refbbuf(i) with value 1 may be counted, where i=0~n−1.

Step S510: Calculate a weighting coefficient according to the quantity of the binary numerals having non-zero value.

Specifically, a weighting coefficient a(i) may be calculated by using a(i)=0.0005+0.002*One_Ref(i)/(m2−m1), where i=0~n−1.

Step S512: Calculate a power spectrum of the current frame collection signal, and calculate a noise level of the current frame collection signal at each frequency.

Specifically, the FFT may be performed on the current frame reference signal, to obtain a power spectrum Capf(j), where j=m1~m2, m1=INT(M*500)/fs*2, m2=INT(M*1200)/fs*2, M is half of a quantity of points of FFT, and fs is a sampling frequency value. Then, at each frequency j, a smoothing value of the current frame Capsm(j, t+1) can be calculated based on the smoothing value of a previous/last frame Capsm(j, t) and the power of the current frame Capf(j). For example, the calculation equation is Capsm(j, t+1)=0.98*Capsm(j, t)+0.02*Cap(j). A noise level N(j) of each frequency may be estimated by using a minima controlled recursive averaging (MCRA) algorithm, where j=m1~m2.

Step S514: Calculate a smoothing value of the current frame collection signal at each frequency.

Specifically, in the embodiment of the present disclosure, it may be calculated that a smoothing value of Capf(j) of each frequency is Capsm(j, t+1)=0.98*Capsm(j, 0+0.02*Cap(j).

Step S516: Perform binarization processing on the power spectrum and the smoothing value, to obtain a second binarization array.

Specifically, numeral comparison may be performed between Cap(j) and Capsm(j, t+1). If Cap(j) is greater than Capsm(j, t+1), the second binarization array is 1; otherwise the second binarization array is 0, so that the second binarization array is obtained, that is, a binarization array of Capb(j) is obtained.

Step S518: Calculate a signal-to-noise ratio of each frequency according to the power spectrum and the noise level.

Specifically, a signal-to-noise ratio snr(j) of each frequency may be obtained by means of calculation by using snr(j)=Cap(j)/N(j), where j=m1~m2.

Step S520: Obtain a quantity and frequency position information of frequencies whose corresponding signal-to-noise ratios are greater than the first preset threshold.

Specifically, a corresponding frequency of snr(j) >THRES_SNR (that is, the first preset threshold) may be identified as k, representing frequency position information of a frequency that belongs to the plurality of frequencies (e.g., the plurality of frequencies used in FFT) and whose corresponding signal-to-noise ratio is greater than the first preset threshold, i.e., k⊆[m1~m2], and a quantity L of frequencies having corresponding signal-to-noise ratios that are greater than the first preset threshold may be counted.

Step S522: Analyze whether a percentage of the quantity in a total quantity of frequencies of the current frame collection signal is greater than a second preset threshold.

Specifically, the analysis may be performed by determining whether L/(m2−m1)>the second preset threshold. The second preset threshold in the embodiment of the present disclosure is a number greater than or equal to 0 and less than or equal to 1, and may be 0.6, 0.7, or the like. The second preset threshold is not limited in the embodiment of the present disclosure, and the technical person may set the second preset threshold according to the requirements or experience of the technical person.

When the analysis result is yes, it is determined that the current frame collection signal is a valid frame signal satisfying the preset condition, and step S524 is performed; otherwise, it is determined that the current frame collection signal is not a valid frame signal satisfying the preset condition, and operations such as echo delay tracking may be given up and is not performed on the current frame collection signal; or the like. This is not limited in the embodiment of the present disclosure. In some embodiments, when the echo delay tracking is given up in response to determining that the current frame collection signal is not a valid frame signal, the following echo cancellation procedure for the current frame collection signal is also cancelled, so as to save system resource and computation power wasted on enhancing invalid/noisy collection signal.

Step S524: Perform a cross-correlation operation of the current frame reference signal and the current frame collection signal on a signal part corresponding to the target frequency.

A differential result value of recent n frames and the current frame collection signal is obtained by means of calculation according to the following formula:

$$CxorR(i) = \sum_{k \subseteq [m1-m2]} Capb(k) XorRefbbuf(i)(k) / size(k),$$

where i is from 0 to n−1; m1=INT(M*500)/fs*2, m2=INT(M*1200)/fs*2; fs is a sampling frequency value, M is half of a quantity of frequencies used in the FFT; k is frequency position information of a target frequency having a corresponding SNR ratio greater than the first preset threshold; Refbbuf(i)(k) is a first target array describing binarization data of the recent n frames at the frequency k; and Capb(k) is a second binarization array obtained by performing the binarization processing according to the power spectrum of the current frame collection signal and the smoothing value of the current frame collection signal at each frequency k.

In one embodiment, according to the above formula, an XOR operation is performed between a binary value representing an ith frame reference signal at a target frequency k and a binary value representing the current frame collection signal at the target frequency k. Such XOR operations are repeated and accumulated/added up for all target frequencies. Accordingly, each recent frame reference signal i has a corresponding differential result value CxorR(i).

Step S526: Perform weighted smoothing processing on a result of the cross-correlation operation according to the weighting coefficient, to obtain a smoothing processing value.

Specifically, the weighted smoothing processing may be performed according to a formula CxorRsm(i)=(1−a(i))*CxorRsm(i)+a(i)*CxorR(i).

Step S528: Select an echo delay value from the smoothing processing value.

Specifically, an i value corresponding to a minimum value in n CxorRsm (i) values may be used as a candidate echo delay value. For example, the ith frame reference signal having the minimum value is considered as producing an echo in the current frame collection signal and may be later filtered out/removed from the current frame collection signal in echo cancellation process. In other words, according to the echo delay value i, assuming a frame is sampled at every 2 ms, the echo produced by the reference signal at previous ith frame is delayed for i*2 ms and appears in the current frame collection signal. In some embodiments, the candidate echo delay value is tracked and is determined as a finally selected echo delay value if the candidate echo delay value satisfies the following three conditions:

1. A peak valley difference of n CxorRsm (i) values (e.g., corresponding to the current frame collection signal) needs to be greater than 5.5.

2. A minimum value in CxorRsm (i) (e.g., corresponding to the candidate echo delay value) needs to be less than 17.5.

3. The candidate echo delay value continuously keeps unchanged in a preset number of frames (e.g., corresponding to the collection signals).

It should be noted that, performance of step S510 and S512 may be omitted, and the smoothing processing in step S524 may be replaced by using the following formula: CxorRsm(i)=(1−a)*CxorRsm(i)+a*CxorR(i), where a is a filtering coefficient.

It should be further noted that, step S502 to S510 and step S512 to S522 may be performed at the same time or may be performed in any sequence. This is not limited in the embodiment of the present disclosure. Step S514 to S516 and step S518 to S522 may be performed at the same time or may be performed in any sequence. This is not limited in the embodiment of the present disclosure.

By implementing the embodiment of the present disclosure, target frequency information in a current frame collection signal is identified, the target frequency being a frequency corresponding to a signal-to-noise ratio greater than a first preset threshold, and then a cross-correlation operation of a current frame reference signal and a current frame collection signal is performed only on a signal part corresponding to the target frequency, and finally an echo delay value is obtained according to a result of the cross-correlation operation, so that it is avoided that a signal component at a frequency with low signal-to-noise ratio interferes the accuracy of the cross-correlation operation, and a technical problem that an existing technical solution has relatively weak interference immunity, and an echo delay is prone to be misjudged, leading to many residual echoes (e.g., residual echoes contained in the current frame collection signal and sent to a participating device of the voice communication for being played with poor quality) is effectively resolved, and the accuracy of the echo delay value is greatly improved. In addition, weighted smoothing processing may be performed on the result of the cross-correlation operation, so that a larger weight is granted by means of weighting to a frame whose feature is obvious, and a convergence speed of echo delay tracking is improved.

Figure 6:
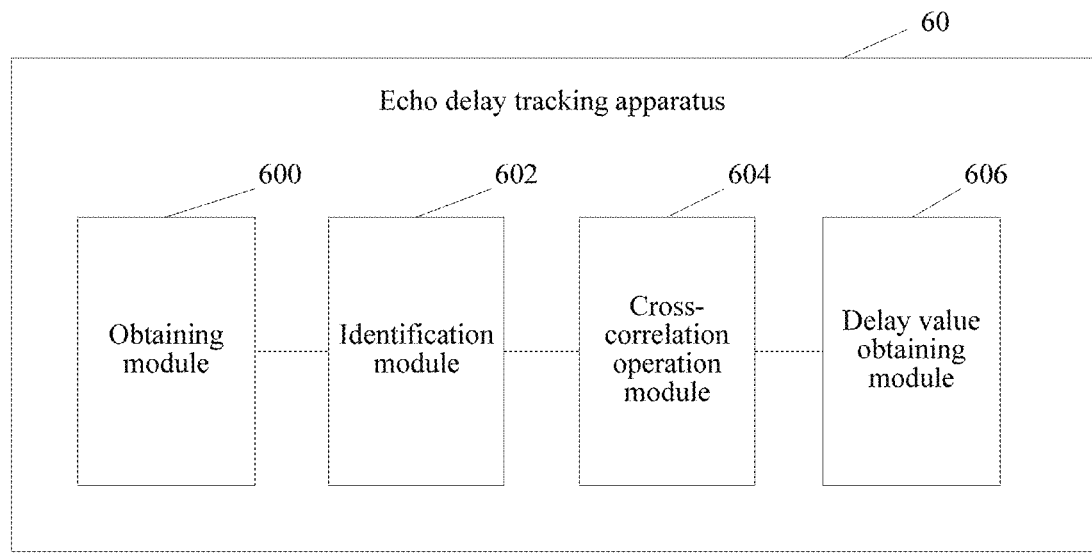
FIG. 6 is a schematic structural diagram of an echo delay tracking apparatus according to an embodiment of the present disclosure.

To better implement the foregoing solutions in the embodiments of the present disclosure, the present disclosure further correspondingly provides an echo delay tracking apparatus. As shown in FIG. 6, FIG. 6 is a schematic structural diagram of an echo delay tracking apparatus according to an embodiment of the present disclosure. The echo delay tracking apparatus 60 may include an obtaining module 600, an identification module 602, a cross-correlation operation module 604, and a delay value obtaining module 606.

The obtaining module 600 is configured to obtain a current frame reference signal and a current frame collection signal.

The identification module 602 is configured to identify target ratio frequency information in the current frame collection signal, the target frequency being a frequency at which a signal-to-noise ratio of a signal component of the current frame collection signal is greater than a first preset threshold.

The cross-correlation operation module 604 is configured to: when it is determined, according to the target frequency information, that the current frame collection signal is a valid frame signal satisfying a preset condition, perform a cross-correlation operation of the current frame reference signal and the current frame collection signal on a signal part corresponding to the target frequency.

The delay value obtaining module 606 is configured to obtain an echo delay value according to a result of the cross-correlation operation.

Figure 7:
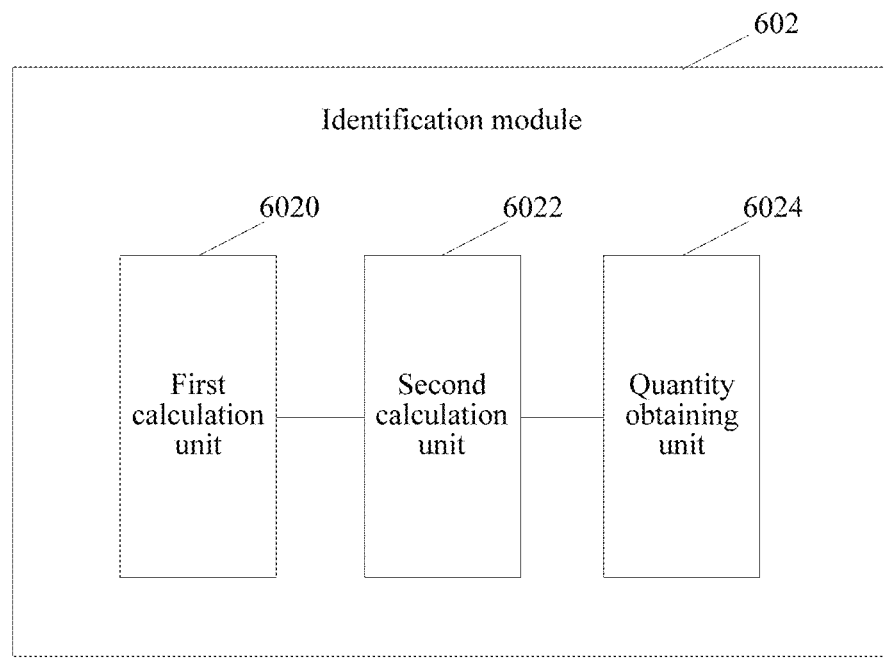
FIG. 7 is a schematic structural diagram of an identification module according to an embodiment of the present disclosure.

Specifically, as shown in FIG. 7, FIG. 7 is a schematic structural diagram of an identification module according to an embodiment of the present disclosure. The identification module 602 may include a first calculation unit 6020, a second calculation unit 6022, and a quantity obtaining unit 6024.

The first calculation unit 6020 is configured to calculate a power spectrum of the current frame collection signal, and calculate a noise level of each frequency.

The second calculation unit 6022 is configured to calculate a signal-to-noise ratio of each frequency according to the power spectrum and the noise level.

The quantity obtaining unit 6024 is configured to obtain a quantity and frequency position information of frequencies with signal-to-noise ratios greater than the first preset threshold.

Figure 8:
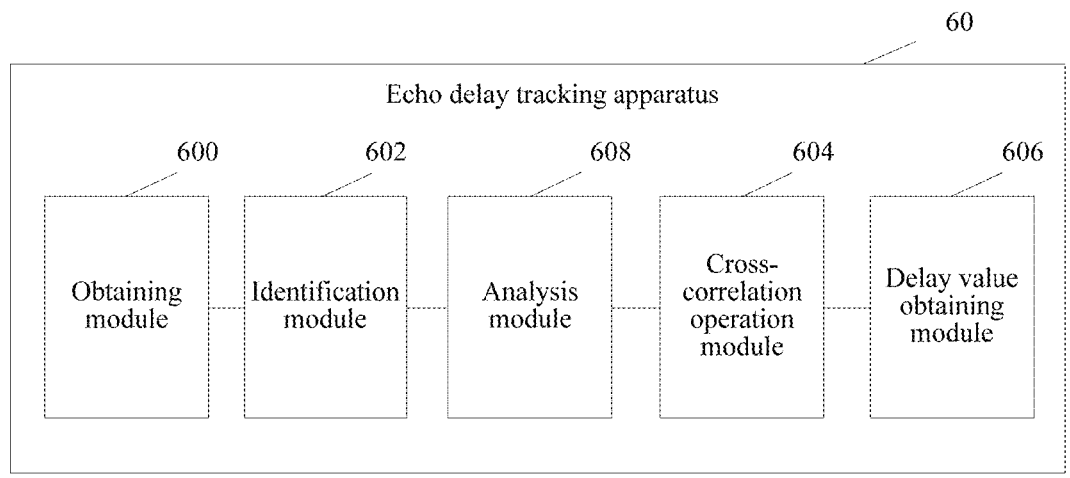
FIG. 8 is a schematic structural diagram of an echo delay tracking apparatus according to another embodiment of the present disclosure.

Further, as shown in FIG. 8, FIG. 8 is a schematic structural diagram of an echo delay tracking apparatus according to another embodiment of the present disclosure. The echo delay tracking apparatus 60 includes an obtaining module 600, an identification module 602, a cross-correlation operation module 604, and a delay value obtaining module 606, and may further include an analysis module 608, configured to: after the identification module 602 identifies the target frequency information in the current frame collection signal, analyze whether a percentage of the quantity in a total quantity of frequencies of the current frame collection signal is greater than a second preset threshold; and when an analysis result is yes, determine that the current frame collection signal is a valid frame signal satisfying a preset condition, and trigger the cross-correlation operation module 604 to perform an operation.

Figure 9:
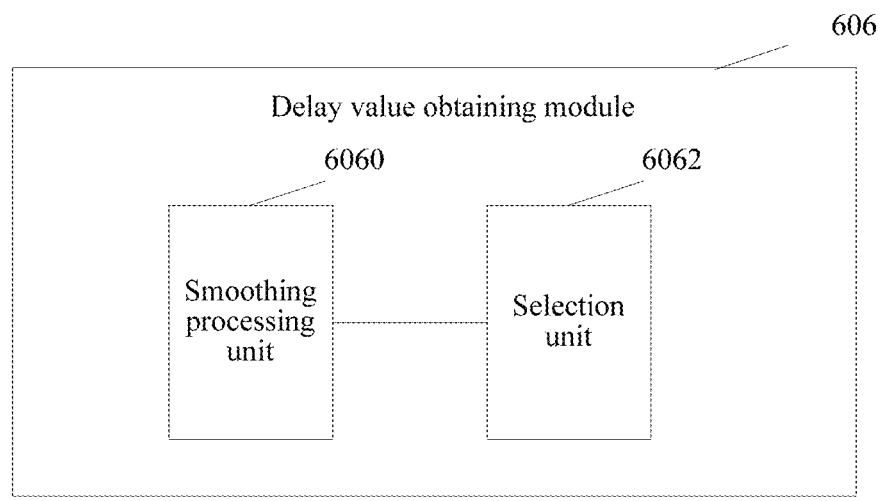
FIG. 9 is a schematic structural diagram of a delay value obtaining module according to an embodiment of the present disclosure.

Still further, as shown in FIG. 9, FIG. 9 is a schematic structural diagram of a delay value obtaining module according to an embodiment of the present disclosure. The delay value obtaining module 606 may include a smoothing processing unit 6060 and a selection unit 6062.

The smoothing processing unit 6060 is configured to perform smoothing processing on a result of the cross-correlation operation, to obtain a smoothing processing value.

The selection unit 6062 is configured to select an echo delay value from the smoothing processing value.

Figure 10:
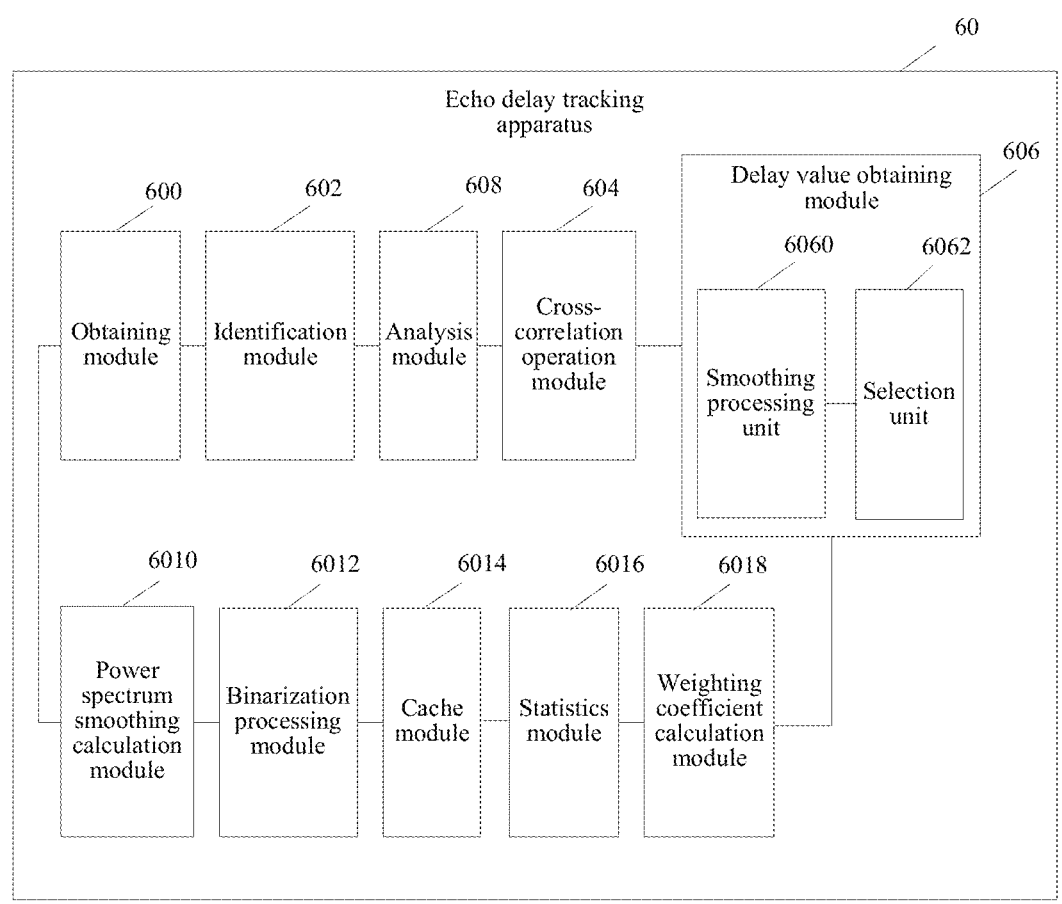
FIG. 10 is a schematic structural diagram of an echo delay tracking apparatus according to another embodiment of the present disclosure.

Still further, as shown in FIG. 10, FIG. 10 is a schematic structural diagram of an echo delay tracking apparatus according to another embodiment of the present disclosure. The echo delay tracking apparatus 60 includes an obtaining module 600, an identification module 602, a cross-correlation operation module 604, a delay value obtaining module 606, and an analysis module 608, and may further include a power spectrum smoothing calculation module 6010, a binarization processing module 6012, a cache module 6014, a statistics module 6016, and a weighting coefficient calculation module 6018.

The power spectrum smoothing calculation module 6010 is configured to: before the smoothing processing unit performs the smoothing processing on the result of the cross-correlation operation, calculate a power spectrum of the current frame reference signal, and calculate a smoothing value of each frequency.

The binarization processing module 6012 is configured to perform binarization processing on the power spectrum and the smoothing value, to obtain a first binarization array.

The cache module 6014 is configured to cache binarization data of most recent n frames, to obtain a target array, the n being a positive integer.

The statistics module 6016 is configured to count a quantity of binary numerals in the target array and including 1.

The weighting coefficient calculation module 6018 is configured to calculate a weighting coefficient according to the quantity of the binary numerals having non-zero value.

The smoothing processing unit 6060 is specifically configured to perform weighted smoothing processing on the result of the cross-correlation operation according to the weighting coefficient.

Still further, the cross-correlation operation module 604 may be specifically configured to:

obtain, by means of calculation according to the following formula, a differential result value of recent n frames and the current frame collection signal:

$$CxorR(i) = \sum_{k \subseteq [m1-m2]} Capb(k) XorRefbbuf(i)(k) / \text{size}(k),$$

where i is from 0 to n−1; m1=INT(M*500)/fs*2, m2=INT(M*1200)/fs*2; fs is a sampling frequency value, M is half of a quantity of the FFT; k is frequency position information of a frequency of the current frame collection signal having a signal-to-noise ratio greater than the first preset threshold; Refbbuf(i)(k) is the first target array; and Capb(k) is a second binarization array obtained by performing the binarization processing according to the power spectrum of the current frame collection signal and the smoothing value of each frequency.

Figure 11:
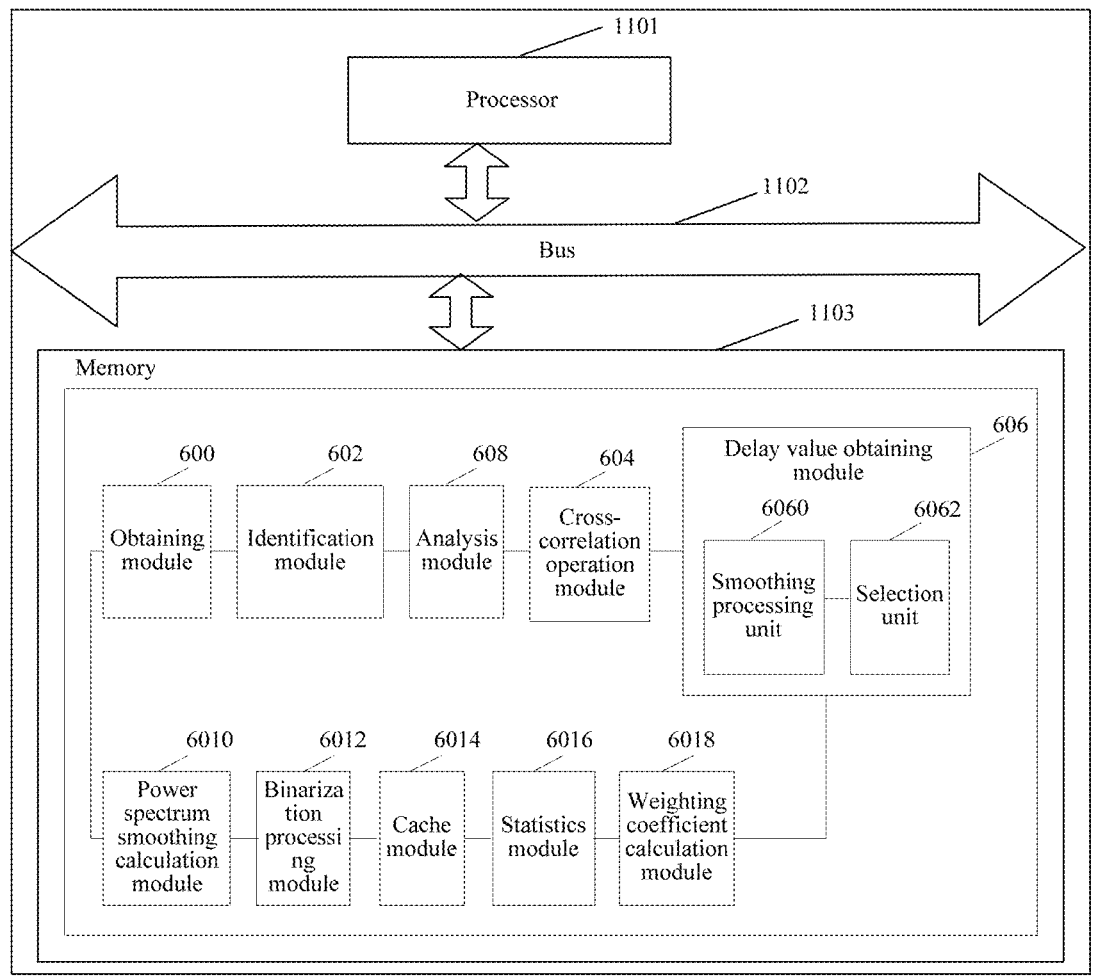
FIG. 11 is a schematic structural diagram of hardware of an echo delay tracking apparatus according to another embodiment of the present disclosure.

FIG. 11 is a schematic structural diagram of hardware of an echo delay tracking apparatus according to another embodiment of the present disclosure. The apparatus may include a processor 1101, a bus 1102, and a memory 1103. The processor 1101 and the memory 1103 are connected to each other by using the bus 1102.

The memory 1103 stores an obtaining module 600, an identification module 602, a cross-correlation operation module 604, and a delay value obtaining module 606.

The memory 1103 may further store an analysis module 608, a power spectrum smoothing calculation module 6010, a binarization processing module 6012, a cache module 6014, a statistics module 6016, and a weighting coefficient calculation module 6018.

The delay value obtaining module 606 may further include a smoothing processing unit 6060 and a selection unit 6062.

When the modules stored in the memory 1103 are executed by the processor 1101, operations performed by the modules are the same as those in the foregoing embodiment, and details are not described herein again.

In conclusion, by implementing the embodiment of the present disclosure, target frequency information in a current frame collection signal is identified, the target frequency being a frequency at which a signal component of current frame collection signal has a signal-to-noise ratio greater than a first preset threshold, and then a cross-correlation operation of a current frame reference signal and a current frame collection signal is performed only on a signal part corresponding to the target frequency, and finally an echo delay value is obtained according to a result of the cross-correlation operation, so that it is avoided that a signal component at a frequency with low signal-to-noise ratio interferes the accuracy of the cross-correlation operation, and a technical problem that an existing technical solution has relatively weak interference immunity, and an echo delay is prone to be misdetermined, leading to many residual echoes is effectively resolved, and the accuracy of the echo delay value is greatly improved. In addition, weighted smoothing processing may be performed on the result of the cross-correlation operation, so that a larger weight is granted by means of weighting to a frame whose feature is obvious, and a convergence speed of echo delay tracking is improved.

A person of ordinary skill in the art may understand that all or some of the processes of the methods in the embodiments may be implemented by a computer program instructing relevant hardware. The program may be stored in a computer-readable storage medium. When the program is executed, the processes of the methods in the embodiments may be performed. The foregoing storage medium may be: a magnetic disk, an optical disc, a read-only memory (ROM), a random access memory (RAM), or the like.

What is disclosed above is merely an example of the embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. An echo delay tracking method performed by a computing terminal including an audio output device and an audio input device, the method comprising:
   collecting at the audio output device a current frame reference signal of a current frame and at the audio input device a current frame collection signal of the current frame;
   obtaining signal-to-noise ratios of the current frame collection signal corresponding to a plurality of frequencies;
   upon determining at a target frequency the current frame collection signal corresponds to one of the signal-to-noise ratios greater than a preset threshold, performing a cross-correlation operation of a signal component of the current frame reference signal corresponding to the target frequency and a signal component of the current frame collection signal corresponding to the target frequency;
   calculating a power spectrum of the current frame reference signal;
   calculating a smoothing value of the current frame reference signal at each of the plurality of frequencies;
   performing binarization processing on the power spectrum and the smoothing value, to obtain a binarization array;
   caching binarization data of n−1 frames before the current frame, n being a positive integer;
   obtaining a target array by adding the binarization array to the binarization data of the n−1 frames;
   counting a quantity of binary numerals in the target array having non-zero value;
   calculating a weighting coefficient according to the quantity of the binary numerals having non-zero value; and
   performing weighted smoothing processing on a result of the cross-correlation operation according to the weighting coefficient to obtain an echo delay value.

2. The method according to claim 1, further comprising:
   determining whether a percentage of a quantity of the target frequency in a total quantity of the plurality of frequencies of the current frame collection signal is greater than a second preset threshold; and
   after determining that the percentage is greater than the second preset threshold, performing the cross-correlation operation on the current frame reference signal.

3. The method according to claim 1, wherein the performing the cross-correlation operation comprises:
   obtaining a first array describing the current frame collection signal at the target frequency, each element of the first binary array corresponding to one frequency;
   obtaining n second arrays describing recent n frames of reference signals at the target frequency, each second binary array representing one recent frame, n being an integer greater than 1;
   for each of the n second arrays, performing an XOR operation between an element of the first array and an element of the second array corresponding to the target frequency to obtain an XOR operation result value.

4. An echo delay tracking apparatus, comprising: a memory; and a processor coupled to the memory, the processor being configured to perform:
   collecting at an audio output device a current frame reference signal of a current frame and at an audio input device a current frame collection signal of the current frame;
   obtaining signal-to-noise ratios of the current frame collection signal corresponding to a plurality of frequencies;
   upon determining at a target frequency the current frame collection signal corresponds to one of the signal-to-noise ratios greater than a preset threshold, performing a cross-correlation operation of a signal component of the current frame reference signal corresponding to the target frequency and a signal component of the current frame collection signal corresponding to the target frequency;
   calculating a power spectrum of the current frame reference signal;
   calculating a smoothing value of the current frame reference signal at each of the plurality of frequencies;
   performing binarization processing on the power spectrum and the smoothing value, to obtain a binarization array;
   caching binarization data of n−1 frames before the current frame, n being a positive integer;
   obtaining a target array by adding the first binarization array to the binarization data of the n−1 frames;
   counting a quantity of binary numerals in the target array having non-zero value;
   calculating a weighting coefficient according to the quantity of the binary numerals having non-zero value; and
   performing weighted smoothing processing on a result of the cross-correlation operation according to the weighting coefficient to obtain an echo delay value.

5. The apparatus according to claim 4, wherein the processor is further configured to perform:

determining whether a percentage of a quantity of the target frequency in a total quantity of the plurality of frequencies of the current frame collection signal is greater than a second preset threshold; and after determining that the percentage is greater than the second preset threshold, performing the cross-correlation operation on the current frame reference signal.

6. The apparatus according to claim 4, wherein the performing the cross-correlation operation comprises:

obtaining a first array describing the current frame collection signal at the target frequency, each element of the first binary array corresponding to one frequency;

obtaining n second arrays describing recent n frames of reference signals at the target frequency, each second binary array representing one recent frame, n being an integer greater than 1; and for each of the n second arrays, performing an XOR operation between an element of the first array and an element of the second array corresponding to the target frequency to obtain an XOR operation result value.

7. A non-transitory computer storage medium, comprising: computer program instructions executable by at least one processor to perform:

collecting at an audio output device a current frame reference signal of a current frame and at an audio input device a current frame collection signal of the current frame;

obtaining signal-to-noise ratios of the current frame collection signal corresponding to a plurality of frequencies;

upon determining at a target frequency the current frame collection signal corresponds to one of the signal-to-noise ratios greater than a preset threshold, performing a cross-correlation operation of a signal component of the current frame reference signal corresponding to the target frequency and a signal component of the current frame collection signal corresponding to the target frequency;

calculating a power spectrum of the current frame reference signal;

calculating a smoothing value of the current frame reference signal at each of the plurality of frequencies;

performing binarization processing on the power spectrum and the smoothing value, to obtain a binarization array;

caching binarization data of n−1 frames before the current frame, n being a positive integer;

obtaining a target array by adding the binarization array to the binarization data of the n−1 frames;

counting a quantity of binary numerals in the target array having non-zero value;

calculating a weighting coefficient according to the quantity of the binary numerals having non-zero value; and performing weighted smoothing processing on a result of the cross-correlation operation according to the weighting coefficient to obtain an echo delay value.

8. The non-transitory computer storage medium according to claim 7, wherein the method further comprises:

determining whether a percentage of a quantity of the target frequency in a total quantity of the plurality of frequencies of the current frame collection signal is greater than a second preset threshold; and after determining that the percentage is greater than the second preset threshold, performing the cross-correlation operation on the current frame reference signal.

* * * * *